(12) United States Patent
Bare et al.

(10) Patent No.: US 9,426,084 B1
(45) Date of Patent: Aug. 23, 2016

(54) METHODS AND SYSTEMS FOR CONTROLLING TRANSMISSION RATES IN NETWORKS

(71) Applicant: QLOGIC, Corporation, Aliso Viejo, CA (US)

(72) Inventors: Ballard Bare, Grass Valley, CA (US); Patrick Bueb, Auburn, CA (US); Martin Harris, Rocklin, CA (US); Dean Scoville, Rocklin, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 107 days.

(21) Appl. No.: 14/609,945

(22) Filed: Jan. 30, 2015

(51) Int. Cl.
| | |
|---|---|
| *H04L 12/28* | (2006.01) |
| *H04L 12/801* | (2013.01) |
| *H04L 12/863* | (2013.01) |
| *H04L 12/861* | (2013.01) |
| *H04L 29/08* | (2006.01) |

(52) U.S. Cl.
CPC .............. *H04L 47/39* (2013.01); *H04L 47/625* (2013.01); *H04L 49/90* (2013.01); *H04L 67/1097* (2013.01)

(58) Field of Classification Search
CPC . H04L 12/10; H04L 12/4641; H04L 12/5693; H04L 43/16; H04L 45/66; H04L 45/70; H04L 45/302; H04L 45/586; H04L 47/10; H04L 47/12; H04L 47/20; H04L 47/22; H04L 47/25; H04L 47/30; H04L 47/39; H04L 47/50; H04L 47/52; H04L 47/522; H04L 47/527; H04L 47/625; H04L 47/822; H04L 47/6255; H04L 49/50; H04L 49/90; H04L 49/101; H04L 49/205; H04L 49/351; H04L 49/352; H04L 49/357; H04L 49/3045; H04L 49/3072; H04L 63/10; H04L 67/1097; H04L 2012/5605; G06F 3/061; G06F 3/0659; G06F 3/067; G06F 13/14; G06F 13/1642; G06F 13/1673; G06F 13/4221
See application file for complete search history.

(56) References Cited

U.S. PATENT DOCUMENTS

| | | | | |
|---|---|---|---|---|
| 5,943,316 A * | 8/1999 | Davis | ...................... | H04J 13/16 370/232 |
| 6,141,327 A * | 10/2000 | Kalkunte | ................ | H04L 47/28 370/252 |
| 7,110,360 B1 * | 9/2006 | Hui | ........................ | H04L 47/10 370/235 |
| 7,512,067 B2 * | 3/2009 | Dropps | ................... | H04L 12/10 370/230 |
| 7,894,348 B2 * | 2/2011 | Dropps | ................. | H04L 49/357 370/229 |
| 7,903,558 B1 * | 3/2011 | Dropps | ................... | H04L 47/26 370/232 |
| 8,924,662 B2 * | 12/2014 | Hughes | ........................ | 711/159 |
| 9,298,493 B1 * | 3/2016 | Harel | ........................ | G06F 9/46 |
| 2005/0257012 A1 * | 11/2005 | Hughes | ............... | G06F 13/1605 711/151 |
| 2008/0062873 A1 * | 3/2008 | Semrad | ................... | H04L 12/66 370/232 |

* cited by examiner

*Primary Examiner* — Tri H Phan
(74) *Attorney, Agent, or Firm* — Klein, O'Neill & Singh, LLP (57) ABSTRACT

Methods and systems for network communications are disclosed. In particular methods and systems for providing communications rate controls from remote sources are provided. For example, a machine-implemented method includes: managing, at a target, a request to transmit (R2T) queue and an associated data credit counter; incrementing the data credit counter based on an allowed transfer rate; selecting an R2T packet from the R2T queue; determining if the R2T packet should be sent based on the data credit counter; sending the R2T packet to an initiator when the R2T packet indicates data transfer less than the data credit counter; and decrementing the data credit counter based on the R2T packet when the R2T packet is sent.

20 Claims, 7 Drawing Sheets

METHODS AND SYSTEMS FOR CONTROLLING TRANSMISSION RATES IN NETWORKS

TECHNICAL FIELD

The present invention relates to network systems and, in particular, to network communications.

BACKGROUND

Computing systems are commonly used today. A computing system often communicates with a peripheral device for performing certain functions, for example, reading and writing information. Oftentimes, computer systems utilize protocols, for example, the Internet Small Computer System Interface (iSCSI) protocol to enable data transfer from one computing system to another or from one computing system to or from a storage system across a network. Continuous efforts are being made to improve communication between computing systems and devices.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In an aspect, a method for remotely controlling transmission rates is disclosed that includes: managing, at a target, a request to transmit (R2T) queue and an associated data credit counter; incrementing the data credit counter based on an allowed transfer rate; selecting an R2T packet from the R2T queue; determining if the R2T packet should be sent based on the data credit counter; sending the R2T packet to an initiator when the R2T packet indicates data transfer less than the data credit counter; and decrementing the data credit counter based on the R2T packet when the R2T packet is sent.

In another aspect, a non-transitory, machine readable storage medium is disclosed in which there are instructions of machine executable code stored thereon for performing a method to: manage, at a target, a request to transmit (R2T) queue and an associated data credit counter; increment the data credit counter based on an allowed transfer rate; select an R2T packet from the R2T queue; determine if the R2T packet should be sent based on the data credit counter; send the R2T packet to an initiator when the R2T packet indicates data transfer less than the data credit counter; and decrement the data credit counter based on the R2T packet when the R2T packet is sent.

In another aspect, a system is provided that includes: a memory containing machine readable medium comprising machine executable code having stored thereon instructions; and a processor module coupled to the memory, the processor module configured to execute the machine executable code to: manage, at a target, a request to transmit (R2T) queue and an associated data credit counter; increment the data credit counter based on an allowed transfer rate; select an R2T packet from the R2T queue; determine if the R2T packet should be sent based on the data credit counter; send the R2T packet to an initiator when the R2T packet indicates data transfer less than the data credit counter; and decrement the data credit counter based on the R2T packet when the R2T packet is sent.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "system," and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable medium. The computer program product may be non-transitory computer storage media, readable by a computer device, and encoding a computer program of instructions for executing a computer process.

Cloud computing is one aspect of the networked computing environment which allows servers to provide centralized data storage and access to computer services and resources. As cloud computing becomes more and more commonplace, the amount of network traffic increases, as does the need to carefully manage the network communication resources so that each user of a computing system receives communications resources and network latency is reduced. However, some computer systems may overwhelm networking resources leading to starvation of other computer resources for some period of time. It is not always easy for a receiving end computer to control the source computer systems from bursting transmissions onto the network.

As cloud storage becomes more common and network communications grow, it is also useful to help ensure that various users (sometimes referred to as tenants) of a cloud network are provided with the contracted network bandwidth. As such, in one aspect, systems and methods for controlling network communications through the receiving end of a communications link (often referred to as a target) are provided. It is noteworthy that, in an aspect, these systems and methods can provide suitable rate control over the communications link without modifying an initiator's communication protocols; indeed, in an aspect, an initiator will have no awareness of rate control operations occurring at the target. In an aspect, a receiving computer, switch, or other network device is referred to as a target, and the device sending a communication is called an initiator. The following inventive aspects will generally be described with respect to iSCSI protocols but it is important to note that similar solutions may be created for other protocols in accordance with the teachings herein.

Figure 1A:
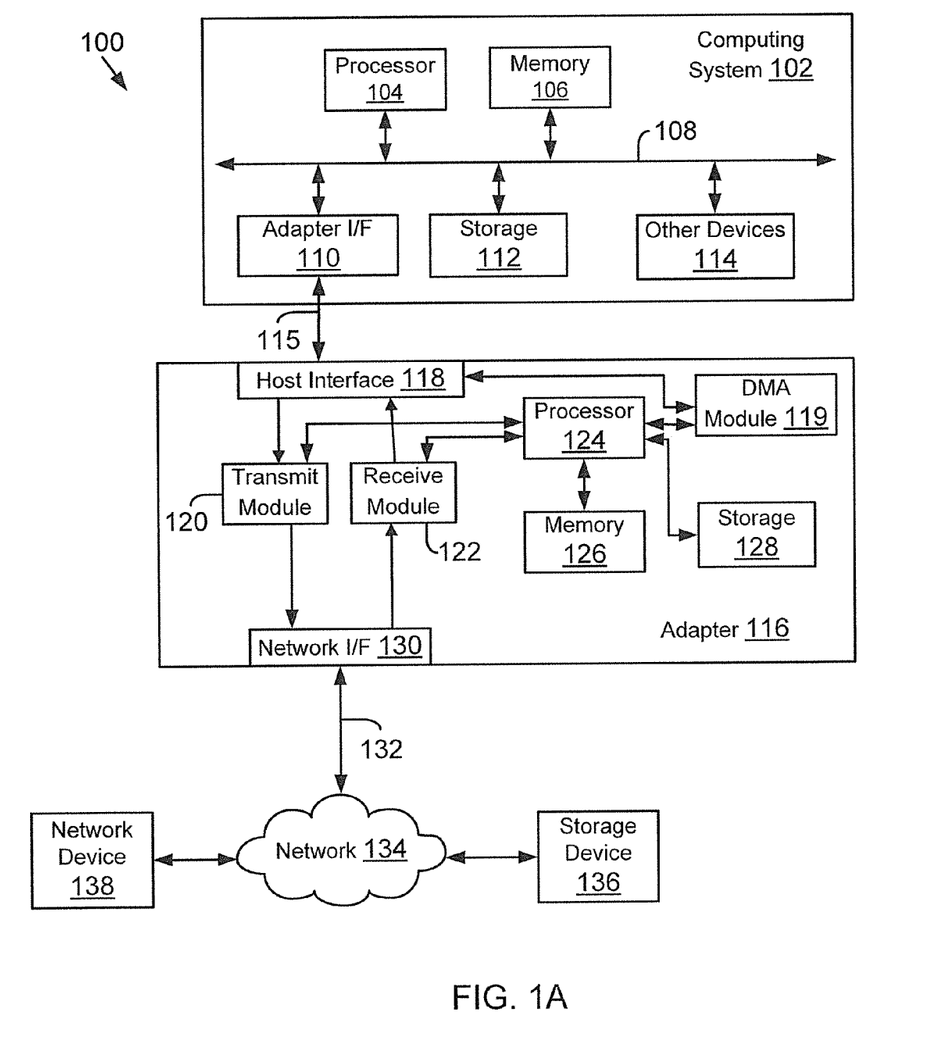
FIG. 1A is a functional block diagram of a system, used according to one aspect of the present disclosure.

System:

FIG. 1A is a block diagram of a system 100 configured for use with the present embodiments. The system 100 may include one or more computing system(s) 102 (may also be referred to as "host system 102") coupled to another device via a link 115, for example, an adapter 116 that interfaces with a network 134. The network 134 may include, for example, additional computing systems 102 (not shown), storage device (s) 136 (that may operate as target devices, for example), network device (s) 138, servers, storage systems and others. Storage device 136 may be a part of a storage system (not shown) that includes a processor and an adapter similar to adapter 116. The adapter for the storage system may be referred to as a target adapter and the storage system may be referred to as a target system.

In one aspect, the network 134 may include a local area network (LAN), a storage area network (SAN), a wide area network (WAN), a virtual private network (VPN), the Internet, combinations of the same, or the like. In one aspect, storage device 136 and network device 138 may include similar modules as those described with respect to computing system 102. As an example, host system 102 (or adapter 116) may be referred to as an initiator and the storage device 136 may be referred to as a target device or target system. The initiator typically initiates an input/output request and the target responds to the request. Storage 136 may interface or is part of a target system that may be similar to host 102A, as described below in detail.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may include, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), and/or any other interconnect type.

An adapter interface 110 facilitates the ability of the computing system 102 to interface with the adapter 116 via the link 115. Link 115 may be an interconnect system, for example, a PCIe bus. The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may include for example a hard disk (HDD), a solid state drive (SSD), a hybrid drive (sometimes referred to as an SSHD), a CD-ROM, a DVD-ROM, a non-volatile memory device (flash or memory stick) and/or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates greater than 100 Mbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

iSCSI is an Internet Protocol- (IP-) based storage networking standard for linking data storage facilities. By carrying Small Computer System Interface (SCSI) commands over IP networks (i.e. mapping SCSI over TCP/IP (Transmission Control Protocol/Internet Protocol), iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, adapter 116 may operate as an iSCSI initiator for reading and writing information from storage device 136.

Referring back to FIG. 1A, adapter 116 interfaces with the computing system 102 via the link 115 and a host interface 118. In one embodiment, the host interface 118 may be a PCI Express interface having logic/circuitry for sending and receiving PCI-Express packets.

The adapter 116 also includes a network interface 130 that interfaces with link 132 via one or more ports (not shown) to network 134. The network interface 130 includes logic and circuitry to receive network packets via the network link 132 and pass it to a receive module 122 for handling. Additionally network interface 130 and network link 132 include logic and circuitry to send network packets over the network 134 coming from a transmit module 120. The transmit module 120 receives communication traffic from host interface 118.

Both the transmit module 120 and receive module 122 may also interact with a processor 124 according to one aspect. In one aspect, processor 124 executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

Figure 1B:
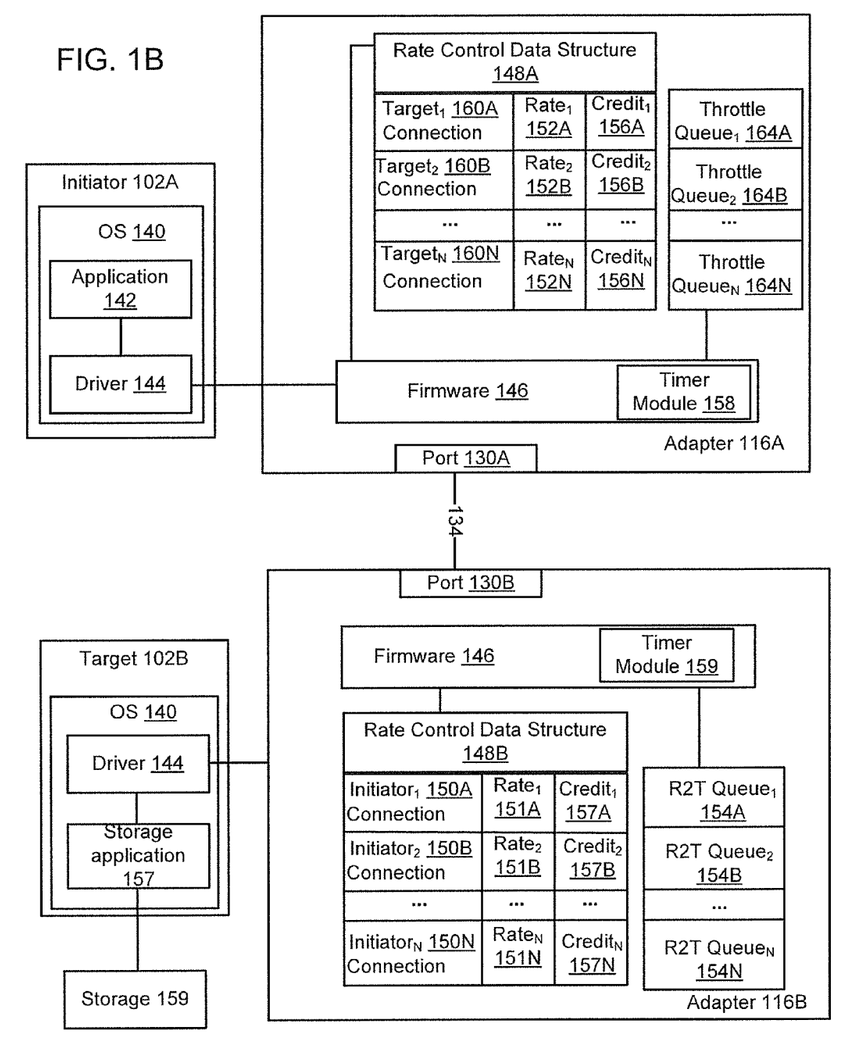
FIG. 1B is a functional block diagram showing components used for network communications in accordance with various aspects of the present disclosure.

Software Architecture:

FIG. 1B shows an example of a software architecture used by system 100, according to one aspect. Computing system 102 are showed as initiator 102A and 102B, each executing one or more processor 104. Processors 104 at the initiator 102A and target 102B, respectively, execute an operating system 140 for controlling the overall operations of the initiator/target computing systems 102A/102B. The operating system may include, for example, a version of iOS™, Windows® Operating System, Linux operating system, UNIX, Solaris, or any other operating system type (without derogation of any third party trademark rights). The disclosures herein are not limited to any particular operating system type.

An application 142 may be executed by the initiator 102A processor 104 for performing certain functions. For example, application 142 may be an email program, a database application or any other application type. Application 142 may send a command to a driver 144 for performing an input/output (I/O) operation, for example, reading and/or writing data at another device. The driver 144 processes the request and communicates with firmware 146 executed by processor 124 of adapter 116A. A component of adapter 116A then processes the request. Firmware 146 further communicates with or includes a rate control data structure 148A to help process outgoing communications and provide controls over those communications as described in more detail herein.

In an aspect, initiator 102A may establish a plurality of connections with one or more target systems. The rate control data structure includes a list of target connections 160A-160N with which the application 142 (or initiator 102A generally) has—or can operate—open communication links. The rate control data structure 148A as illustrated also includes a communications rate 152A-152N associated with each target connection 160A-160N. In an aspect, the rate control data structure 148 further includes a credit counter 156A-N for each target 160A-N. The credit counters 156A-156N maintains a running tally of available credit for transmitting data described below in detail. Additionally, a throttle queue 164A-164N is associated with each target connection 160A-160N. The throttle queues are used to control data transmission for a particular connection. The throttle queues 164x are illustrated as separate data structures from the rate control data structure 148A that can be accessed by the firmware 146, but it is understood that they may be incorporated in the rate control data structure 148A in various other aspects. In an aspect, the throttle queues are First-In-First-Out (FIFO) queues but other data structures may also be utilized. The rate control data structure 148A enables rate limiting operations when helpful to limit or open transmissions to a given target 160x, as described below in detail.

In an aspect, the firmware 146 of adapter 116A also includes or communicates with a timer module 158. The timer module 158 is used to help calculate observed data rates for various target connections 160A-160N. Adapter 116A includes one or more ports 130A (referred to as network interfaces 130 in FIG. 1A) to connect to network 134 and communicate with the target system 102B. In an aspect, the target system 102B similarly communicates with the network 134 through an adapter 116B having a port 130B. In an aspect, target 102B represents a storage system 134.

In an aspect, target 102B includes processor 104 (as described with respect to FIG. 1A). Processor 104 of the target computing system 102B executes an operating system 140 for controlling the overall operations of the target computing system 102B. The operating system may include, for example, a version of iOS™, Windows® Operating System, Linux operating system, UNIX, Solaris, or any other operating system type. The disclosures herein are not limited to any particular operating system type. In an aspect, the OS 140 includes the driver 144 for communicating with the firmware 146 of adapter 116B.

The target 102B may further execute a storage application 157 for communication with storage 159. Storage 159 may include direct attached storage, networked storage, hard drives, solid state drives, combinations of the same, and the like.

In an aspect, target adapter 116B's firmware 146 communicates with or includes a rate control data structure 148B to help process incoming communications and provide rate controls over those communications as will be described in more detail herein. In an aspect, the rate control data structure includes a list of initiator connections 150A-150N with which the storage application 157 (or target computing system 102B generally) has or can operate open communication links. The rate control data structure 148B as illustrated includes a communications rate 151A-151N associated with each initiator 150A-150N. In an aspect, the rate control data structure 148 further includes a credit counter 157A-N for each initiator 150A-N. The credit counter 157$x$ maintains a running tally of the available credit for transmission as will be described more fully below.

Additionally, a request to transmit (R2T) queue 154A-154N is associated with each initiator 150A-150N. In an aspect the R2T queue is a first-in-first-out (FIFO) queue but other data structures may also be utilized. In various aspects, the R2T queues 154$x$ may be incorporated within rate control data structure 148B or may be separately accessible through firmware 146. In iSCSI, an R2T message is sent from a target to an initiator in order to indicate that the target is ready to receive a transmission. The R2T packet can also include a size to indicate how much the target can accept. By monitoring the R2T packets that a given target sends and controlling when they are sent, a target computing system 102B can utilize rate control data structure 148B to enable rate limiting operations when helpful to limit or open transmissions from a given initiator 150$x$ even when credit is available for the initiator to send data, as described below in detail.

In one aspect, the firmware 146 of adapter 116B also includes or communicates with a timer module 159. The timer module 159 is used to help calculate observed data rates for various initiator 150$x$ connections.

While FIG. 1B is illustrated with one computing system operating as a target (102B) and one computing system acting as an initiator (102A), it is important to note that any computing system/adapter combination that includes a rate control data structure 148 and/or implements the teachings of the present disclosure may act as both an initiator and a target in various situations. As such, one adapter 116A/116B may include both the rate control data structure 148A and the rate control data structure 148B (or a combined one) and may also control throttle queues 164$x$ for acting as an initiator as well as R2T queues for acting as a target. Moreover, it is important to note that one computing system 102 and/or adapter 116 may implement the teachings herein and communicate with both initiators and targets across a network where the other initiators and targets do not implement the teachings prescribed herein without losing the advantages taught. The disclosure herein is specifically intended to provide communications benefits across a network even if only one side of a communications link includes these improvements. The details of the operations of these components are described below.

Furthermore, it is important to note that the various teachings and aspects described herein may be distributed amongst a computing system 102 and adapter 116 in a variety of different ways. Although FIG. 1B illustrates most of the data structures and processing occurring within adapter 116, some or all functions or data structures may be distributed within computing system 102, such as for example, controlled by driver 144 and or OS 140. Shifting the data structures and processing tasks associated therewith does not detract from the teachings herein.

Figure 1C:
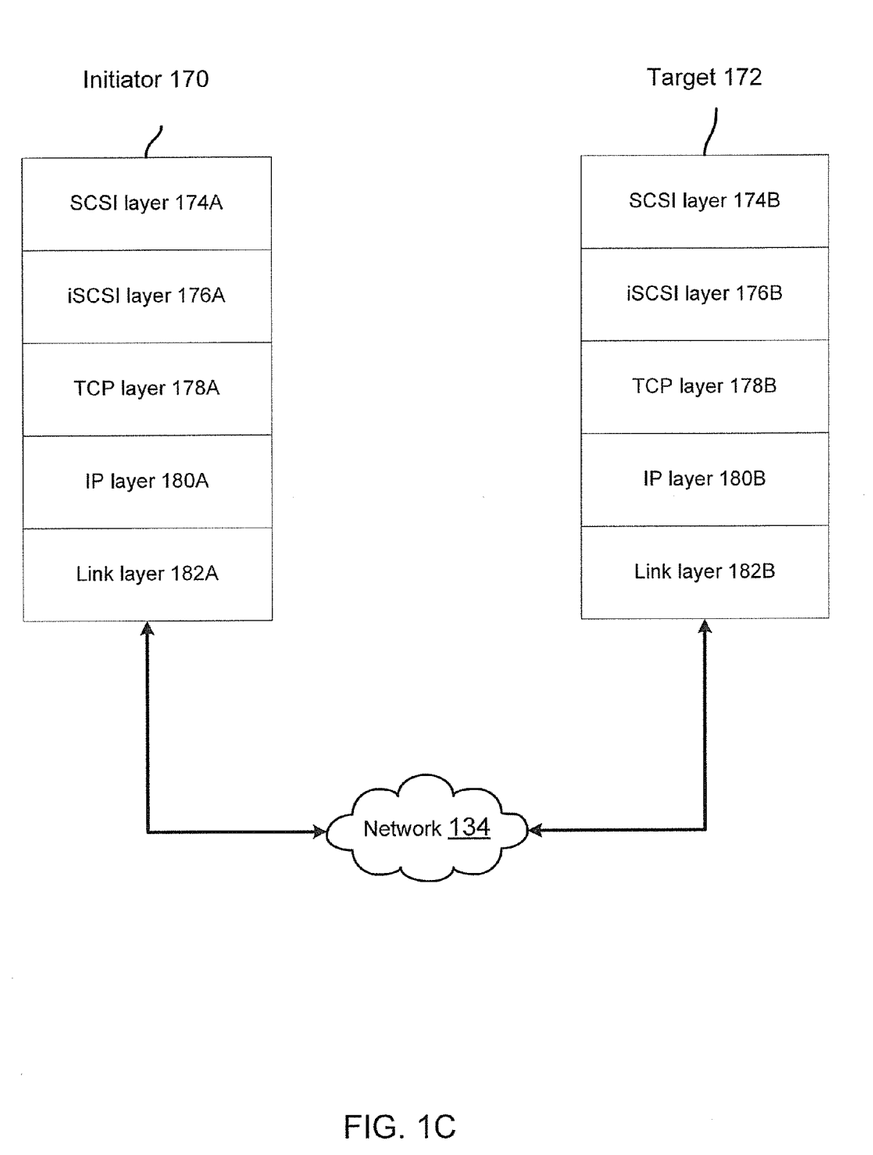
FIG. 1C is a functional block diagram showing a communications stack that may be used in accordance with aspects of the disclosure.

Communication Stack:

FIG. 1C illustrates a typical protocol stack for processing communications between an initiation 170 (for example, 102A) and a target 172 (for example, 102B) as may be utilized with aspects of the disclosure herein. The initiator stack includes a SCSI layer 174A, an iSCSI Layer 176A, a TCP layer 178A, an IP layer 180A and a link layer 182A. The target stack 172 also includes a SCSI layer 174B, an iSCSI Layer 176B, a TCP layer 178B, an IP layer 180B, and a link layer 182B. The communications stacks, as illustrated, are an abstraction of a number of processing modules that may be implemented in hardware, software, firmware or a combination thereof, of systems as described above in FIGS. 1A-1C. In various aspects, different layers may be carried out in the computing system 102 and the adapter 116. In another aspect, when the computing system 102 is acting as an initiator, the various layers may be distributed among application 142, driver 144, and adapter 116 (including its firmware 146). Each layer of a communications stack typically communicates with the layer directly above and below it to carry out various functions for transmitting a particular communication from one system to another (generally referred to as an initiator and target).

In a typical system, the computing system 102 may utilize the SCSI protocol, implemented in the SCSI layer 174A, B in FIG. 1C, to physically connect and transfer data between computers and peripheral devices. However, this can be limited when working with large networks. As such, many systems implement SCSI commands over IP networks utilizing iSCSI, particularly for linking data storage facilities. The iSCSI protocol allows computing systems 102 (operating as an initiator) to send SCSI commands to SCSI storage devices, such as storage device 136, (operating as a target).

In FIG. 1C, the SCSI layer 174A communicates with iSCSI layer 176A to send out a SCSI request or command. The iSCSI layer 176A often relies on an underlying transport layer to establish connections and is generally responsible for end-to-end message transfer independent of the underlying network, along with error control, segmentation, flow control, congestion control, and application addressing (port numbers). In one aspect, the iSCSI layer 176A communicates using the TCP layer 178A that in turn relies on the IP layer 180A, to manage routing of packets across networks, such as network 134. TCP layer 176A and IP layer 178A operate as transport layers in network communication. The IP layer 180A communicates with the link layer 182A to move packets between the IP layer interfaces of two different computing devices on the same link. Oftentimes this is managed in hardware, such as network interface 130. The various layers in the target stack 152 communicate in a similar manner as the initiator stack 170.

In a typical system, computing system 102 acting as an initiator initiates the initiator communications stack 170. A SCSI command issued by application 142, for example, is communicated from the SCSI layer 174A to iSCSI layer 176A, which prepares the command for transmission over a network. The command is sent to TCP layer 178A, which in turn sends the command to the IP layer 180A. IP layer 180A uses the link layer 182A to send the command. The link layer 182A encapsulates the command in a frame and transmits the frame over network 134 to the target communication stack 172. The target stack 172 operates on the frame in the reverse order to decode the command from link layer 182B to IP layer 180B to TCP layer 178B to iSCSI layer 176B to SCSI layer 174B, which can execute on the command as sent.

Figure 2:
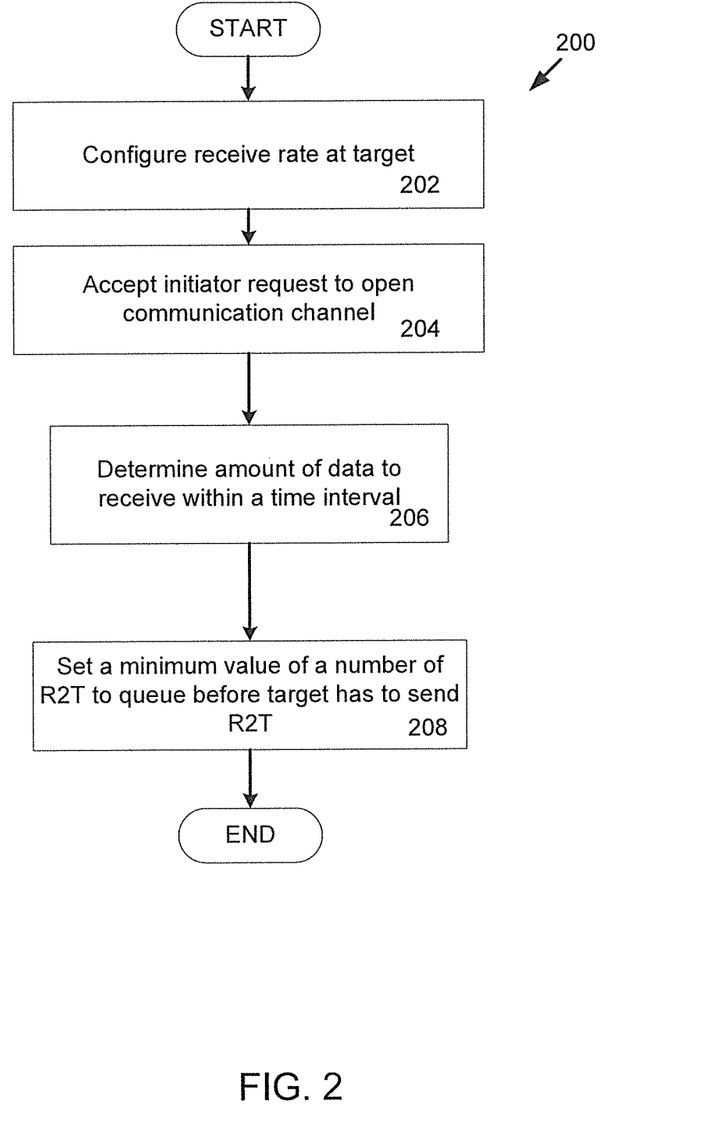
FIG. 2 is a flow chart of a process for initializing a communications control component in accordance with one aspect of the present disclosure.

Process Flows:

FIG. 2 illustrates a process 200 for configuring a target receive rate in accordance with an aspect of the present disclosure. Starting at block 202, the computing system 102B and or driver 144 configures a receive rate to associate with one or more initiators. In an aspect, a user interface is provided to a systems administrator or other user to configure the target computing system 102B. The systems administrator may program the receive rate as a rate 151$x$ in the rate control data structure 148B. In other aspects, the rate 151$x$ may be predefined in a rate control data structure 148B or may be stored as a rate 151$x$ in the rate control data structure 148B based on rules or data stored elsewhere in the system.

At block 204, a target adapter 116B (through its firmware 146, in an aspect) accepts a request from an initiator (another network component wishing to communicate) to open a communication channel. In another aspect, this may be handled by driver 144. In an aspect, this may include creating a new entry in a rate control data structure 148B for the new initiator connection (150x) and associating it with an R2T queue 154x. At block 206, this rate 151x may be used to control what an initiator can send by controlling the number R2T packets that are sent using the R2T queue 154x. This enables a target to control transmissions from multiple initiators that may be communicating with the target system at any given time. In an aspect, then at block 208, the target system may determine a minimum number of R2T packets to queue before it sends one to the initiator.

In another aspect, a system administrator may make rules for connection rates of various prioritized applications, application types, and/or the like. In an aspect, these rules may be stored within an OS 140 on a computing system 102, within firmware 146 on an adapter, or other area accessible by the firmware 146. During a target (or initiator) connection initialization process then, the target connection 160x (or initiator connection 150x) may be added to the rate control data structure 148B and then the associated rate 151x can be determined from the rules. In essence, this reverses blocks 202 and 204 in some aspects. Rates 151x or rules to determine rates can be based on a wide variety of variables. In one aspect, rates will differ based on the initiator, the type of data an initiator is seeking, or many other criteria, such as, for example, a VLAN (Virtual Local Area Network) that an initiator is on or an owner of the initiator (which might be found via a VxLAN (virtual extensible local area network) header). In some aspects, initiators may also be able to be grouped together to share a common rate 151x or bandwidth. This is especially useful in a cloud environment where a cloud provider will provide a data rate based on a tenant type.

Figure 3A:
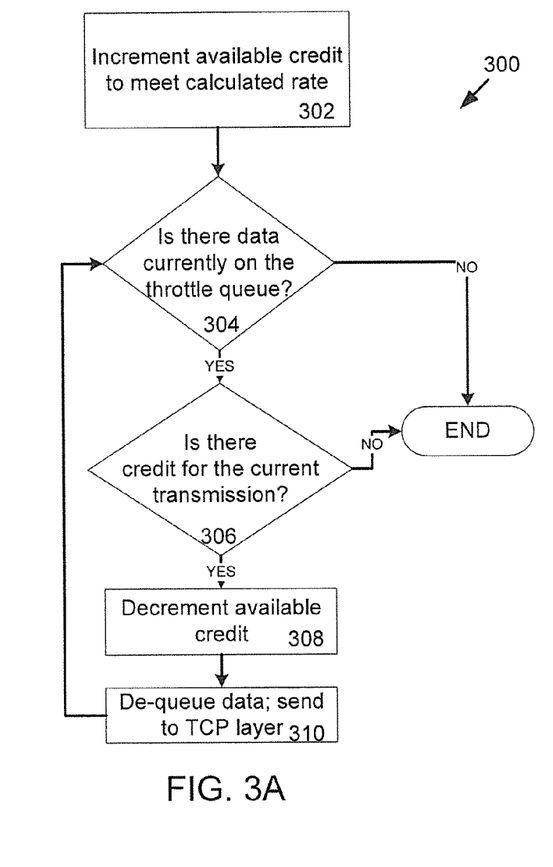
FIGS. 3A-3B are flow charts for controlling outbound communications from an initiator to a target, according to one aspect of the present disclosure.
Figure 3B:
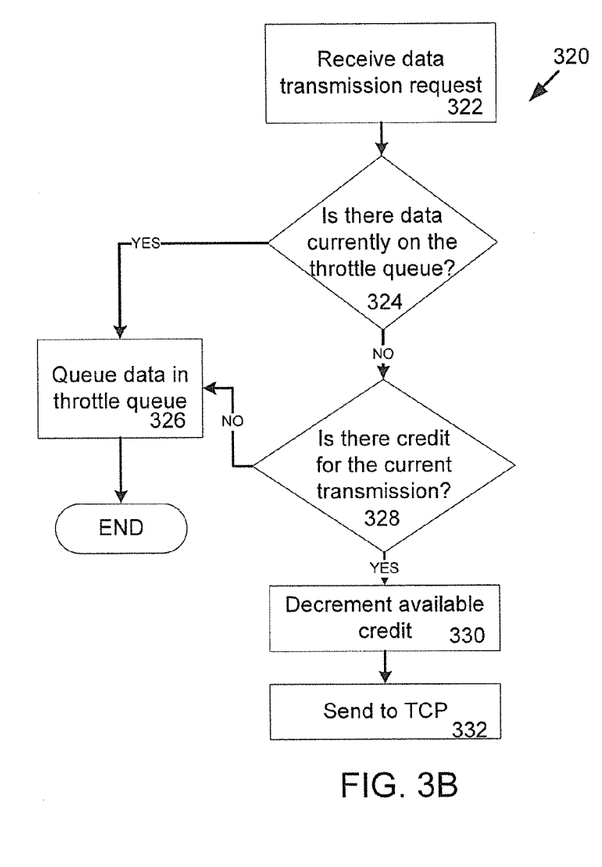

FIGS. 3A and 3B describe processes for regulating data flow out from a computer system 102 or other device to a storage device 136 or other network device 138, for example. In this case, a rate control data structure 148A may be organized by target connections 160x rather than initiator connections 150x. More specifically, FIG. 3A illustrates a process 300 for managing transmission credits, such as by a timer module 158. In an aspect, the process 300 begins with block 302, where the firmware 146 uses the timer module 158 to increment the available credit 156x for a given target connection 160x by an amount to meet the calculated rate (such as a rate 152x stored in a rate control data structure 148A in an entry associated with that connection/communication channel). Next, the firmware 146 uses the timer module 158 to determine if there is data currently in the associated throttle queue 164x (block 304). If not, the process simply ends, and the associated target connection 160x generally has a larger credit to send data in the future. In an aspect, the credit 156x may be limited to a maximum amount so that the target connection/communication channel cannot burst data onto the network and overwhelm network operations, which may starve other communications channels for at least some period of time. hi such an aspect, a check may be run after block 304 (not shown) which ensures a credit cap. In another such aspect, the process at block 302 can take this concern into account in handling its rate calculations.

If there is currently data in a throttle queue, the process 300 proceeds to block 306. At block 306, the process determines if there is credit for the data in the throttle queue to be transmitted (by comparing the credit value 156x for that target connection 160x to the size of the current transmission or transmission packet at the head of the throttle queue 164x). Again, if not, the process ends. If the credit is sufficient to allow the current transmission, then the appropriate credit 164x is decremented at block 308, and the data is dequeued from the throttle queue and sent to a TCP layer for transmission to the target at block 310. The process may then return to block 304 to see if there is more data in the throttle queue that can be transmitted based on the available credit.

In an aspect, process 300 may run periodically, such as after a certain number of clock cycles, a fixed or variable amount of time, or the like. In another aspect, the process 300 may keep track of the time between operations and the process, at block 302, will increment credit by taking into account the time since the last process 300 operation.

Turning to FIG. 3B, a process 320 illustrating operations of firmware 146 of adapter 116 (or a driver 144 or other computing system 102 component in various aspects), which may implement an iSCSI communications stack layer 176A, are described in accordance with an aspect of the disclosure. In an aspect, the iSCSI layer 176A has access to the same rate control data structure 148 as described with reference to FIGS. 1B and 3A, including the throttle queue 164x. Process 320 begins at block 322 where a data transmission request is received (such as from an application 142) for transmission of data to a specific target connection 160x. At block 324, the process checks to see if there is data currently in the appropriate throttle queue 164x as associated with the target 160x. If there is data in the queue, the new data transmission request is queued in the throttle queue at block 326 and the process ends. If there is no data in the throttle queue 164x, the process proceeds to blocks 326, where the process 320 checks to see if there is credit for the current transmission request based on the credit counter 156x. If there is not, the new data transmission request is queued in the throttle queue at block 326 and the process ends. If there is credit for the transmission, then the process 320 reduces the available credit at the credit counter 156x (block 330) and forwards the data transmission request to the TCP layer for transmission to the appropriate target (block 332).

Taken together then, FIGS. 3A and 3B represent processes 300 and 320 for incrementing and decrementing transmission credits over time to smooth out data transmissions for any given communication channel where the adapter 116 and/or computing device 102 is sending data transmissions (acting as an initiator 102A is simply an example). The processes help prevent data bursts by one initiator-target connection from an initiator's perspective. This may be useful in a computing system that feeds data to a large number of other systems, such as for example, with read I/O commands directed to a storage system array or storage device 136. It is important to note that the processes of FIGS. 3A and 3B are not limited to being implemented by an initiator. A target system could also limit its outgoing data transmissions in the same way in various aspects.

Figure 4A:
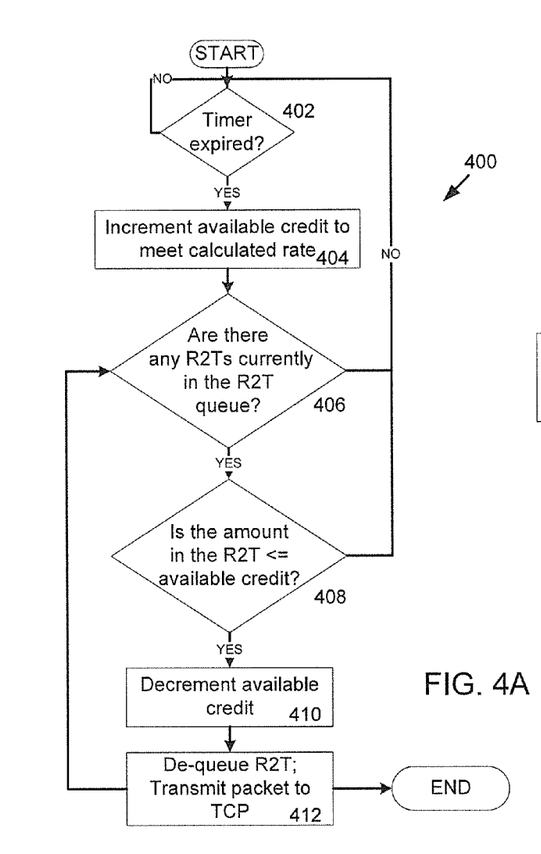
FIGS. 4A-4B are flow charts for controlling inbound communications by a target receiving communications from an initiator, according to one aspect of the present disclosure.
Figure 4B:
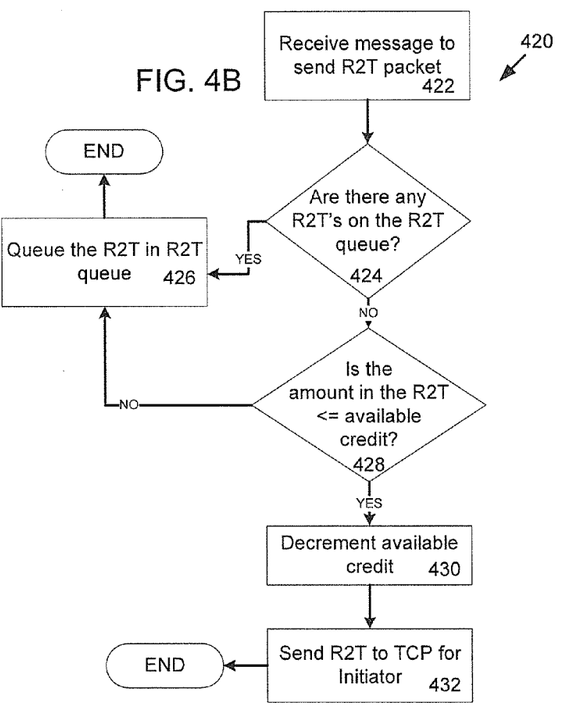

Turning to FIGS. 4A and 4B, processes 400 and 420 are illustrated to provide remote control of initiators from a target's (102B, receiving system's) perspective. Specifically, turning to FIG. 4A, a process 400 illustrates a firmware 146 and its use of timer module 159 in communications processes in which the computing system 102 that acts as a target 102B. Starting with block 402, the firmware 146 checks the timer module 159 to see if an amount of time has expired. As discussed generally with the process 300 of FIG. 3A, this may include a particular set or varied amount of clock cycles. The processes may also be scheduled based on resource availability, preferably within a maximum time or cycle limit. If not, the process may go into a wait state before checking again, returning to block 402. Once a timer 159 has expired, the process 400 continues to block 404 where an appropriate credit 156$x$ (See FIG. 1B) is incremented for a given initiator connection 160$x$. The amount of credit incremented will depend on the assigned rate 152$x$, in an aspect.

The process continues to block 406, where the R2T queue 154$x$ associated with the given initiator connection 150$x$ is checked to see if there are R2T messages in it. If not, the process returns to block 402. If there are, the process 400 checks to see if the R2T packet at the head of the R2T queue 154$x$ (See FIG. 1B) is less than or equal to the accumulated credit for that initiator connection (credit counter 156$x$). If not, the process 400 returns to block 402 to wait for additional credit to accumulate. On the other hand, if there is a sufficient amount of credit, the process proceeds to block 410 where the available credit 157$x$ is decremented by the amount of the R2T packet at the head of the queue, and, at block 412, the R2T packet is dequeued and transmitted to the TCP layer (178A, FIG. 1C) for processing. The process then ends. As discussed with respect to process 300 above, the process 400 may run periodically, such as after a certain number of clock cycles, a certain amount of time, or the like. In some aspects, the process may dequeue as many R2T packets as the current credit level allows (blocks 408-412) before exiting.

FIG. 4B then illustrates a companion process 420 which illustrates operations of the firmware 146 of adapter 116B (or a driver 144 or other computing system 102 or adapter 116 component in various aspects), which may implement an iSCSI communications stack layer 176B, in accordance with an aspect of the disclosure. In an aspect, the iSCSI layer has access to the same rate control data structure 148 as described with reference to FIGS. 1B and 4A, including the R2T queue 154$x$. The process 420 starts at block 422 where a request to send an R2T packet is received. In an aspect, this may comprise a fully formed R2T request but in others it may be an indication to create an R2T request with or without particular parameters, for example. At block 424, the process checks to see if there are any R2T packets already in the R2T queue 154$x$ for the appropriate communications link with initiator connection 150$x$. If yes, then the process continues to block 426 where a new R2T packet is queued in the R2T queue 154$x$. The process then ends.

If there are no R2T packets in the R2T queue 154$x$, the process 420 continues to block 428 where a new R2T packet is checked against the available credit (credit counter 157$x$). If the R2T packet would allow more data to be sent by the initiator than the credit 157$x$ currently allows, then the R2T packet is queued in block 426, and the process ends. If the R2T packet indicates transmission of an amount of data less than the available credit 157$x$, then the process continues to block 430. The credit counter 157$x$ is decremented by the amount of the R2T packet at block 430, and the R2T packet is sent to the TCP layer 178B for transmission to the initiator 102A associated with the initiator connection 150$x$ at block 432.

In this manner, a target iSCSI device 102B can control the rate at which it accepts data from various sources. It is noteworthy that an initiator system as described with respect to FIGS. 1B and 3A-3B may or may not also act as a target and implement the ideas of FIGS. 1B and 4A-4B and vice versa. It should also be noted that the processes of FIGS. 3A-3B and 4A-4B are examples only. In various aspects, for example, the different processes may be carried out by one or more of a timer module 158/159, driver 144, adapter firmware 116, and/or the like. Additionally, the timer module 159 may purely handle incrementing credit counters 156$x$/157$x$; while an iSCSI layer 176 implemented in a driver 144 or firmware 146 may handle all processing of R2T queues 154 and/or throttle queues 164 and decrementing the counters when appropriate. Various other arrangements of the processes 300, 320, 400, and 420 will be understood and fall within the scope of this disclosure.

It is also important to note that the processes of FIGS. 3A-3B and 4A-4B are described with respect to one initiator-target connection. In various aspects, the processes 300, 320, 400, and 420 may process each target-initiator connection in the rate control data structure 148 at each block before moving on to the next one. In other aspects, the processes may cycle through multiple or all blocks of a process with one or other subset of target-initiator connections before moving on to another target-initiator connection or subset.

Figure 5A:
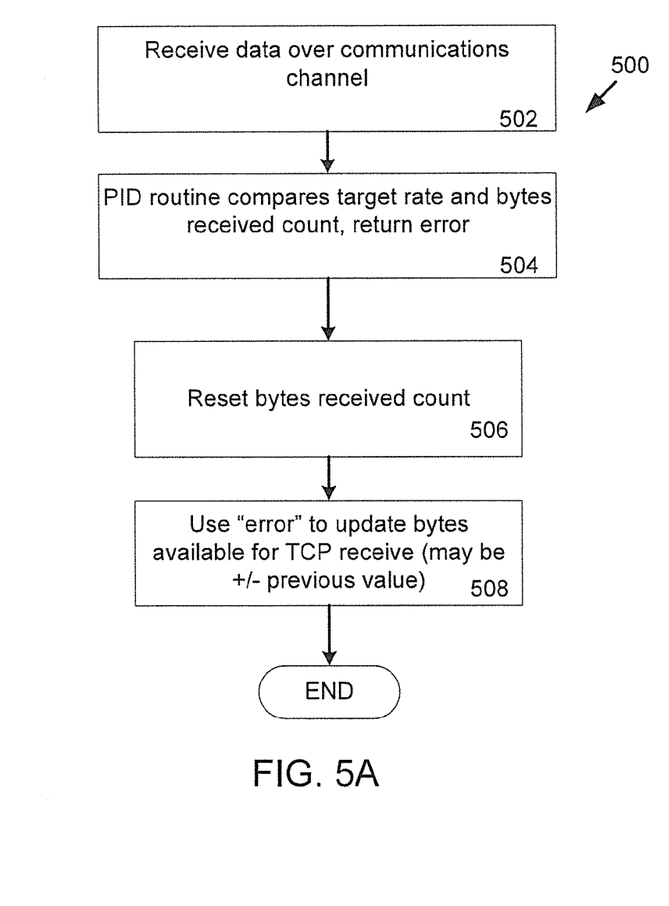
FIGS. 5A-5B are flow charts for processing communications in another aspect of the present disclosure.
Figure 5B:
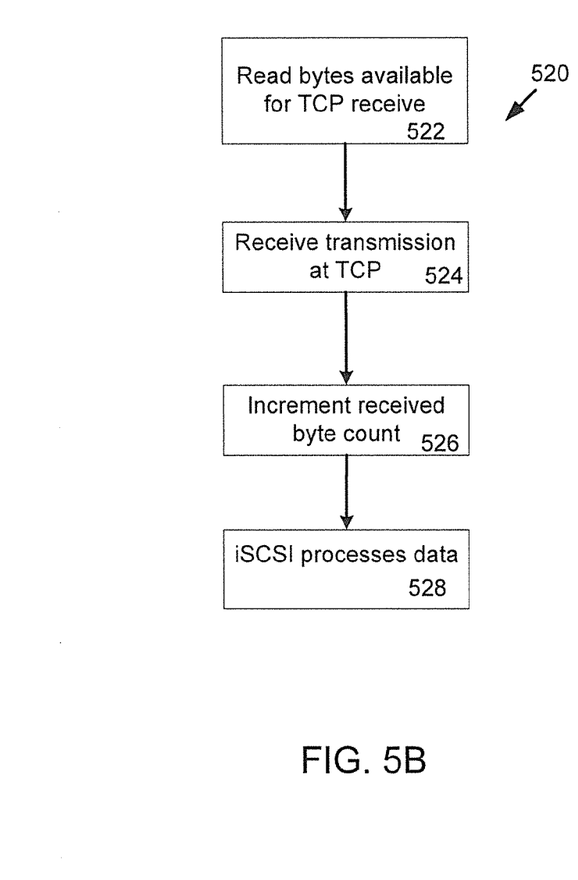

FIGS. 5A and 5B illustrate another aspect of the invention for controlling data rates of inbound traffic through the TCP protocol. In an aspect, this may create a communications layer between an iSCSI 176 and a TCP layer 178 without having to modify either layer. In another aspect, the TCP layer 180 may be modified. In these processes, the amount of available receive memory buffer is modified to control, indirectly, the TCP layer's allowance of received data.

As before with respect to FIG. 1B, a target receive data rate for a given connection (rate 152$x$) is determined. In FIG. 5A, process 500 begins at block 502 where data is received over the communications channel from the selected initiator. At block 504, a PID routine compares the target receive data rate with the number of bytes actually received. In an aspect, the PID is a proportion integral derivative algorithm that returns an error correction. The PID when tuned correctly will dampen big corrections to avoid oscillations and approach a desired data receive rate. There are tuning values (gains) for each of the factors. For example, the proportional part of the algorithm would look at difference between a desired value and a current value and if the gain is 1 its contribution would be a difference (either + or − depending on if the value is over or under the target). The integral part is an integration of past errors (typically weighted more heavily with current error). The derivative part is the rate of change of the error (difference between error this time and the last time). These error components are combined into the error correction output. At block 506, a bytes received count is reset, and at block 508 the error correction output is used to adjust the amount of memory a given TCP connection is told is available for receive buffering.

This indirectly controls the window size that TCP uses to tell its peer how much data it can send. Because this is indirect a PID (proportional integral derivative) algorithm is used to calculate an error that indicates how much over or under the target rate the settings are for a given time interval. This error is then used to adjust the number of bytes the TCP connection is told are available to receive data. In an aspect, the TCP layer is essentially left unchanged and naturally uses this value to determine the window size to tell the remote (initiator) TCP layer how much data it can send.

FIG. 5B indicates the process 520 of receiving data over such a connection. The TCP layer reads bytes available (as set by process 500) at block 522. As packets are received by the TCP layer (at block 524) and passed up to the iSCSI layer, the receive count is incremented (at block 526). The iSCSI layer then processes the incoming data normally (block 528). The concept here is that the iSCSI initiator is indirectly controlled by getting the target TCP layer to adjust its receive buffer window credit appropriately. In an aspect, this model adds a small per connection interval timer and a small layer between TCP and iSCSI and has the advantage that it requires virtually no changes to the TCP or iSCSI protocols. This mechanism should work for any credit window based transport and isn't iSCSI specific, however since we are working on iSCSI in Roseville this example uses iSCSI as the layer above TCP. This mechanism not as accurate as the leaky bucket method used for outbound flow control. In another aspect, the TCP layer is modified so that it is directly controlling the credit window sent to its peer based on the current data rate received.

Although the present disclosure has been described with reference to specific embodiments, these embodiments are illustrative only and not limiting. For example, although the description above has been described with respect to a computing system and an adapter, other network devices, such as routers, switches, servers, or the like may be configured to perform the foregoing functions. The processing of various levels of the communications layers as described herein may also occur in different hardware and software/firmware modules than the specific examples set forth herein. For example, the shim ordering layer may be processed on a host or computing system 102, rather than on an adapter 116. Similarly, other protocols may be substituted for various levels of the communication stack without departing from the teachings of aspects of this disclosure. Additionally, the description herein provides a number of examples in relation to a storage system, but the teachings are equally applicable to other general or special purpose networking systems. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method, comprising:
managing, at a target, a request to transmit (R2T) queue and an associated data credit counter;
incrementing the data credit counter based on an allowed transfer rate;
selecting an R2T packet from the R2T queue;
determining if the R2T packet should be sent based on the data credit counter;
sending the R2T packet to an initiator when the R2T packet indicates data transfer less than the data credit counter; and
decrementing the data credit counter based on the R2T packet when the R2T packet is sent.

2. The method of claim 1, wherein the allowed transfer rate is based on a minimum data rate or a maximum data rate.

3. The method of claim 2, further comprising:
receiving a request to send an R2T packet;
adding a new R2T packet to the R2T queue when there are other R2T packets in the queue;
when there are no other R2T packets in the queue, sending the new R2T packet to an initiator when the new R2T packet indicates data transfer less than the data credit counter; and
when the new R2T packet indicates data transfer less than the data credit counter, decrementing the data credit counter based on the new R2T packet.

4. The method of claim 1, wherein the R2T packet comprises an iSCSI R2T packet.

5. The method of claim 1, wherein:
managing the R2T queue and the associated data credit counter are accomplished in conjunction with an iSCSI communications layer; and
sending the R2T packet to the initiator when the R2T packet indicates data transfer less than the data credit counter occurs, at least in part, with a TCP communications layer.

6. The method of claim 1 further comprising:
managing, at a second initiator, a throttle queue and an associated second data credit counter;
incrementing the second data credit counter based on an allowed transfer rate;
processing a data transmission request having an associated data transmission;
determining if the data transmission should be sent based on the second data credit counter;
sending the data transmission to a second target, when the data transmission request indicates a data transfer less than the second data credit counter; and
decrementing the second data credit counter based on the data transmission request, when the data transmission request indicates a data transfer less than the second data credit counter.

7. The method of claim 6 wherein the second initiator and the target are the same computing system.

8. A non-transitory, machine readable storage medium having stored thereon instructions for performing a method, comprising machine executable code which when executed by at least one machine, causes the machine to:
manage, at a target, a request to transmit (R2T) queue and an associated data credit counter;
increment the data credit counter based on an allowed transfer rate;
select an R2T packet from the R2T queue;
determine if the R2T packet should be sent based on the data credit counter;
send the R2T packet to an initiator when the R2T packet indicates data transfer less than the data credit counter; and
decrement the data credit counter based on the R2T packet when the R2T packet is sent.

9. The storage medium of claim 8, wherein the allowed transfer rate is based on a minimum data rate or a maximum data rate.

10. The storage medium of claim 9, further comprising code to:
receive a new R2T packet;
add the R2T packet to the R2T queue when there are other R2T packets in the queue;
when there are no other R2T packets in the queue, send the new R2T packet to an initiator when the new R2T packet indicates data transfer less than the data credit counter; and
when the new R2T packet indicates data transfer less than the data credit counter, decrement the data credit counter based on the new R2T packet.

11. The storage medium of claim 8, wherein the R2T packet comprises an iSCSI R2T packet.

12. The storage medium of claim 8, wherein the code to:
manage the R2T queue and the associated data credit counter are accomplished in conjunction with an iSCSI communications layer; and send the R2T packet to the initiator when the R2T packet indicates data transfer less than the data credit counter occurs, at least in part, with a TCP communications layer.

13. The storage medium of claim 8, wherein the instructions further comprise code to:
manage, at a second initiator, a throttle queue and an associated second data credit counter;
increment the second data credit counter based on an allowed transfer rate;
process a data transmission request having an associated data transmission;
determine if the data transmission should be sent based on the second data credit counter;
send the data transmission to a second target, when the data transmission request indicates a data transfer less than the second data credit counter; and
decrement the second data credit counter based on the data transmission request, when the data transmission request indicates a data transfer less than the second data credit counter.

14. The storage medium of claim 13, wherein the second initiator and the target are the same computing system.

15. A system, comprising:
a memory containing machine readable medium comprising machine executable code having stored thereon instructions; and
a processor module coupled to the memory, the processor module configured to execute the machine executable code to:
manage, at a target, a request to transmit (R2T) queue and an associated data credit counter;
increment the data credit counter based on an allowed transfer rate;
select an R2T packet from the R2T queue;
determine if the R2T packet should be sent based on the data credit counter;
send the R2T packet to an initiator when the R2T packet indicates data transfer less than the data credit counter; and
decrement the data credit counter based on the R2T packet when the R2T packet is sent.

16. The system of claim 15, wherein the allowed transfer rate is based on a minimum data rate or a maximum data rate.

17. The system of claim 16, further comprising instructions to:
receive a new R2T packet;
add the R2T packet to the R2T queue when there are other R2T packets in the queue;
when there are no other R2T packets in the queue, send the new R2T packet to an initiator when the new R2T packet indicates data transfer less than the data credit counter; and
when the new R2T packet indicates data transfer less than the data credit counter, decrement the data credit counter based on the new R2T packet.

18. The system of claim 15, wherein the R2T packet comprises an iSCSI R2T packet.

19. The system of claim 15, wherein the code to:
manage the R2T queue and the associated data credit counter are accomplished in conjunction with an iSCSI communications layer; and
send the R2T packet to the initiator when the R2T packet indicates data transfer less than the data credit counter occurs, at least in part, with a TCP communications layer.

20. The system of claim 15, wherein the instructions further comprise code to:
manage, at a second initiator, a throttle queue and an associated second data credit counter;
increment the second data credit counter based on an allowed transfer rate;
process a data transmission request having an associated data transmission;
determine if the data transmission should be sent based on the second data credit counter;
send the data transmission to a second target, when the data transmission request indicates a data transfer less than the second data credit counter; and
decrement the second data credit counter based on the data transmission request, when the data transmission request indicates a data transfer less than the second data credit counter.

* * * * *